UNITED STATES PATENT OFFICE 2,513,793

ORGANO-METALLIC COMPLEXES AND METHODS OF MAKING THE SAME

Edouard Frommel, Geneva, Switzerland, assignor to Laboratoire Sapos S. A., Geneva, Switzerland, a corporation of Switzerland No Drawing. Application April 27, 1948, Serial No. 23,617. In Switzerland May 6, 1947

5 Claims. (Cl. 260—429)

It is well known that certain organic bases, notably certain tertiary and quaternary amines such as acetyl-choline, adrenaline, hydrastinine, emetine, ephedrine, morphine, codeine, ergotamine, dihydro-ergotamine, yohimbine, histamine, quinidine, papaverine, atropine, histidine, priscol, privine, and so on, possess physiological properties but that their action will only last for a comparatively short time. For instance, acetyl-choline when used to lower the arterial pressure will hardly exert its action upon a rabbit for an hour.

It is also well known that generally organic bases by combination with gold and platinum salts will give crystalline organo-metallic complexes which are nearly insoluble in water. Owing to the crystalline form of said complexes and to their characteristic melting points they provide a means for the analytic determination of amines and organic compounds.

On one hand, I have now found that organic bases and notably the ones which possess physiological properties will form complexes not only with gold and platinum salts but also with other metal salts such as those of iron, nickel, cobalt, zinc, manganese, cadmium, copper, etc.; on the other hand, I have discovered that the said new and generally water-soluble complexes possess the same fundamental physiological properties as the bases from which they are derived but that their action will last for a much longer time. Effectively, once said complexes are present in the subject's organism, they are decomposed and eliminated much more slowly than simple salts (e. g. chlorides) of the bases considered. This unavoided discovery has a considerable importance in the province of slowly-acting medicines since it makes it possible to lengthen the duration of the physiological effect of certain organic bases such as the ones enumerated hereinbefore by using the new complexes formed by said bases with metal salts rather than said bases themselves.

For instance, I have found that whereas a simple salt of a base remains physiologically effective for about half an hour, after which it is eliminated, the corresponding organo-metallic complex will remain effective for a much longer time, e. g. several hours. It should be pointed out that with a particular base the stabilisation is variable depending on which metal salt same is combined with.

This invention relates to the said new organometallic compounds, and to a method of producing the same.

These new organo-metallic compounds correspond to the following formula:

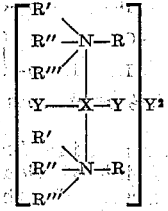

wherein X is a metal of the group consisting of manganese, iron, nickel, cobalt, zinc, cadmium, copper, etc., Y is a halogen, for instance chlorine, N is nitrogen and R, R', R" and R''' are organic residues.

The method for preparing said compounds comprises reacting a salt containing an inorganic anion, e. g. a hydro-halogenide (preferably the hydro-chloride) of an organic base with a metal salt which similarly contains an inorganic anion, for instance a halogenide and preferably a chloride.

As organic bases there may be cited: acetylcholine, adrenaline, hydrastaline, emetine, ephedrine, morphine, codeine, ergotamine, dihydro-ergotamine, yohimbine, histamine, quinidine, quinine, papaverine, atropine, histidine, priscol, privine, etc.

As metal salts there may be mentioned those of manganese, iron, nickel, cobalt, zinc, cadmium, copper, etc.

Amongst the many organo-metallic complexes having the structure defined hereinbefore the ones that contain manganese are particularly valuable since they are not toxic. In particular, by reacting two molecular weights of acetylcholine hydrochloride with one molecular weight of manganese chloride there is obtained acetylcholine mangano-chloride which is a new substance possessing the same physiological properties as acetyl-choline but which if used instead of said base will exert its effect for a much longer time than actually does the base.

How the method according to the invention may be performed will now be explained by way of example in connection with the production of said acetyl-choline mangano-chloride:

On the one hand 2 gram-molecules (i. e., 363 g.) of anhydrous acetyl-choline hydrochloride are dissolved in 2 litres of 100% alcohol.

On the other hand 1.5 gram-molecules (i. e., 189 g.) of manganese chloride ($MnCl_2$) are dissolved in 2 litres of 100% alcohol.

The last-mentioned solution is instilled while stirring into the acetyl-choline hydrochloride solution.

When the mixing is completed after about half an hour, stirring is discontinued and the reaction mixture allowed to settle for about another half an hour; a deposit of the pale green organo-metallic complex is thus obtained which is filtered out by suction, washed with 100% alcohol and dried in a vacuum. The yield amounts to 91% of the theory.

The salt obtained is not hygroscopic; it is highly soluble in water (colorless solution), almost insoluble in 100% alcohol and insoluble in ether. Its melting point is 157–159° C. Its aqueous solutions remain stable for several months.

As revealed by its complete analysis its bulk formula is:

$$C_{14}H_{32}O_4N_2Cl_2Mn$$

and may be written thus:

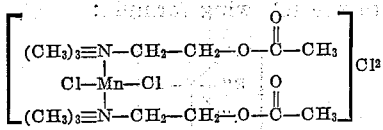

It contains 11.23% of Mn; its molecular weight is 489.

This compound can be injected. Its value from the therapeutic point of view is considerable since, other factors remaining the same, its effects upon e. g. a rabbit will last nine times longer than those of acetyl-choline. Effectively, whereas the injection of a given dose of acetyl-choline will exert its effect for 45 minutes, the injection of a dose of the said compound containing the same amount of the acetyl-choline radicle will exert its effect for 7 hours.

Acetyl-choline mangano-chloride is not very stable; alkalies will precipitate manganese out of its aqueous solution. However, this inconvenience is largely outset by the fact that said compound is not hygroscopic; moreover, its aqueous solutions the pH value of which ranges from 4 to 6 will remain stable for several months.

What I claim is:

1. An organo-metallic complex of the formula

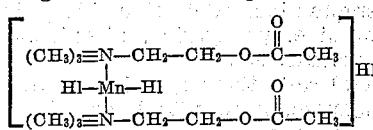

wherein Hl is a halogen.

2. An organo-metallic complex of the formula

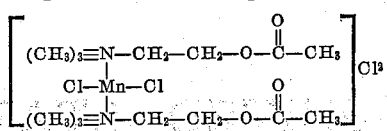

melting at 157–159° C., not hygroscopic, highly soluble in water, almost insoluble in 100% alcohol and insoluble in ether.

3. A method of producing an acetyl-choline manganohalogenide consisting in reacting two molecules of an acetylcholine hydrohalogenide with one molecule of a manganese dihalogenide.

4. A method of producing acetyl-choline mangano-chloride consisting in reacting two molecules of acetyl-choline hydrochloride with one molecule of manganese dichloride.

5. A method of producing acetyl-choline mangano-chloride consisting in dissolving two gram-molecules of acetyl-choline hydrochloride in two litres of 100% alcohol, instilling thereinto a solution of about one gram-molecule of manganese dichloride in two litres of 100% alcohol, filtering out the precipitate, washing same with alcohol and drying it under a vacuum.

EDOUARD FROMMEL.

REFERENCES CITED

The following references are of record in the file of this patent:

"Chem. Centralblatt," 1898, I, page 893, abstract of German publication by Gulewitsch.

"Chem. Centralblatt," 1898, II, page 1184, abstract of German publication by Gulewitsch.

"Chem. Centralblatt," 1907, II, page 1832, abstract of German publication by F. W. Schmidt.

Guth: "Monatshefte fur Chemie," vol. 45 (1924), page 633.

E. J. Fischer: "Wissenschaftliche Veroffentlichungen aus dem Siemens-Konzern," vol. 4, pt. II (1925), pp. 172, 176, 182, 183.

Jones et al.: "Jour. Am. Chem. Soc.," vol. 52 (1930), pp. 307–310.

Karrer: "Organic Chemistry," (3rd Eng. ed. 1947) page 239.